April 2, 1957 R. E. UPHOFF 2,787,010
HOLLOW SLOTTED TAP WITH SUPPORT MEANS FOR THE SLOTTED PORTION
Filed Sept. 14, 1955
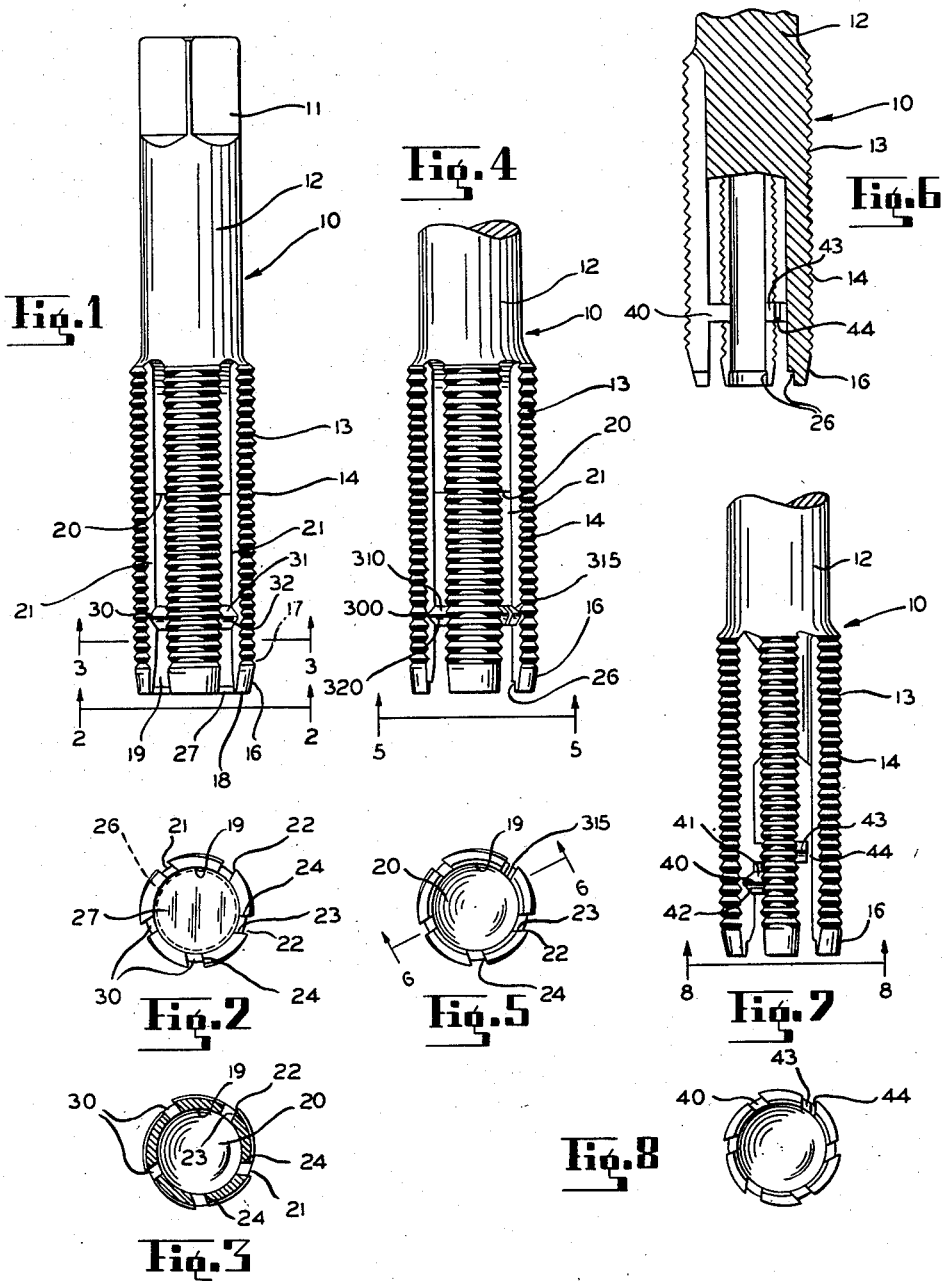
INVENTOR.
RALPH E. UPHOFF
BY
ATTORNEYS

United States Patent Office 2,787,010
Patented Apr. 2, 1957

2,787,010

HOLLOW SLOTTED TAP WITH SUPPORT MEANS FOR THE SLOTTED PORTION

Ralph E. Uphoff, Madison, Wis.

Application September 14, 1955, Serial No. 534,213

9 Claims. (Cl. 10—146)

This invention relates generally to a tap used for threading drilled holes or recesses and comprising an elongated rod member including a driving portion at one end whereby torque may be applied to the tap and a shank having a body portion and an externally threaded portion at the other end. The tap of the present invention is particularly characterized by an axially extending recess or bore extending from the start end of the tap and axially inwardly of the threaded portion. There is thus provided threaded walls which, in accordance with the principles of the present invention, are characterized by the provision of a plurality of fissures or slots which are formed in the thread walls to provide a plurality of cutting blades. One side of each respective cutting blade is sharply angled while the other side of the cutting blade is disposed in a radial plane intersecting the axis of the tap. There is thus provided a sharp angled leading edge providing a sloping cutting wall which terminates in a straight walled follower heel. The tap of the present invention also includes spacing means which are located in the fissures or slots to control the contraction and deformity of the cutting blades.

It is an object of the present invention, therefore, to provide a tap construction which is stronger than ordinary flute type taps.

Another object of the present invention is to provide a tap which will cut smoother threads, which will be easier to operate and which will be self-cleaning and offer a low resistance to torque.

Yet another object of the present invention is to provide a tap having a great increase in the number of cutting blades available for operative cutting.

Another object of the present invention is to provide a tap having an increased guiding surface for easier starting straight into the bore of a nut or a hole.

Yet another object of the present invention is to provide a tap which contracts slightly in running from a first partial thread cut to a full cut and then gradually expands to finish the threads, thereby combining in one tap the working advantage of using a tapering starting tap and a finishing plug tap.

A still further object of the present invention is to provide in a tap controlled resiliency and desired rigidity, thus eliminating binding, chiseling, and chattering in tap operation and affording the provision of a fine continuous thread-like cut throughout an entire threading operation.

Another object of the present invention is to provide a tap which speeds up thread cleaning of heat-treated work because of the low resistance.

Many other features, advantages and additional objects of the present invention will become manifest to those versed in the art upon making reference to the detailed description which follows and the accompanying sheet of drawing in which a preferred structural embodiment of a tap embodying the principles of the present invention is shown by way of illustrative example.

On the drawings:

Figure 1 is an elevational view of a tap provided in accordance with the principles of the present invention;

Figure 2 is an elevational view of the tap of Fig. 1 taken substantially on line II—II of Fig. 1;

Figure 3 is a cross-sectional view of the tap shown in Fig. 1 taken substantially on line III—III of Fig. 1;

Figure 4 is an elevational view of an alternative embodiment of the tap provided in accordance with the principles of the present invention;

Figure 5 is an end elevational view of the tap shown in Fig. 4 taken substantially on line V—V of Fig. 4;

Figure 6 is a cross-sectional view of an alternative embodiment of tap provided in accordance with the principles of the present invention;

Figure 7 is an elevational view of the tap shown in Fig. 6;

Figure 8 is an end elevational view of the tap shown in Fig. 7 taken substantially on line VIII—VIII of Fig. 7.

As shown on the drawings:

The tap of the present invention is indicated generally by the reference numeral 10 and includes a driving portion 11 which may conveniently comprise a square by means of which a twisting force or torque may be applied to the tool.

The tap 10 further includes a shank having a generally cylindrical body portion 12 and an externally threaded portion 13 which extends substantially to the end of the tool. The threads of the tap 10 are indicated specifically by the reference numeral 14. At the very end of the shank, the tap 10 is tapered to provide a start end 16. The amount of taper of the start end 16 is such as to extend from a portion of the threaded end 13 wherein the threads are at full thread depth, for example as at 17 to the extremity of the tool where the start end is finished smooth and at less than full thread depth, for example as indicated at 18.

Extending axially inwardly of the tap 10 from the start end 16 is a recess or bore 19. The recess or bore 19 preferably is from 0.50 to 0.60 of total diameter of the threaded portion 13 and extends axially to a depth of approximately 0.60 of the threaded portion 13. Thus, the recess or bore 19 terminates in an end wall indicated at 20.

The tap of the present invention is further characterized by the formation in the threaded walls of the threaded portion 13 of a plurality of fissures or slots 21. Preferably, from 3 to 8 fissures 21 are cut through the thread walls and extend from the exterior of the tap to the center recess or bore 19.

As is most clearly indicated in the views of Figs. 2, 3, 5 and 8, the provision of the fissures or slots 21 in the thread walls results in the formation of a plurality of circumferentially spaced cutting blades, each constituting a segment of the threaded portion 13. One side of each cutting blade is sharply angled, thereby to form a sharp angled leading edge 22 providing a sloping cutting wall 23. The other side of the cutting blade is disposed generally in a radial plane intersecting the axis of the tap 10, thereby to provide a straight walled follower heel indicated at 24. If desired, the start end 16 of the tap 10 may be provided with a counter bore 26, thereby to form a shoulder for seating a flat circular disc member 27. Thus, the fissures or slots 21 carry thread cuttings to the center of the recess or bore 19, sliding freely over the sloping cutting wall 23 to the center bore of the tap. The thread cuttings are retained within the recess or bore 19 by the disc 27, a feature which is particularly advantageous when the tap 10 is employed in tapping a vertical hole or recess in a block.

In order to control the rigidity of the tap 10 because of the necessity of affording different degrees of rigidity for different types of material and applications of the tap 10 and in order to endow the cutting blades of the tap 10 with arch-like characteristics to control the contraction of the cutting blades because of pressure and deformity resulting from the torque of the driving force, spacing means are provided in accordance with the principles of the present invention.

In the embodiment of Fig. 1, the spacing means constitutes a continuous annular ring 30, that is, it is a continuous annular ring in the sense that a plurality of concentrically disposed segments are interposed between the cutting blades in each of the fissures or slots 21 so that the spacing means resembles a continuous annular ring integral with the cutting blades. Each segment of the blade 30 starts slightly below the thread depth of the threads 14 on the threaded portion 13 and it will be noted that the ring 30 is spaced axially inwardly of the start end 16. Moreover, the spacing means 30 of the embodiment of Fig. 1 is chamfered to provide a tapered top surface 31 and a tapered bottom surface 32 (Fig. 1).

In the embodiment of the invention illustrated in Figs. 4 and 5, the tap 10 is identical in all respects with the tap of Fig. 1 although it will be understood that the disc member 27 may or may not be used depending upon the desire of the operator. The spacing means of the embodiment of Figs. 4 and 5, however, differ from the spacing means described in connection with Fig. 1 in that one of these segments is particularly characterized by the formation therein of a radially extending slot in register with one of the fissures 21. Thus, it will be noted that the spacing means are indicated at 300 and like Fig. 1 have a tapered top surface 310 and a tapered bottom surface 320. The slot in one of the segments is indicated at 315 and it will be understood that the provision of such slot gives a different degree of rigidity which may be desired for special application.

In the embodiment of Figs. 6, 7 and 8, the spacing means constitute a plurality of axially staggered segments. Thus, each spacer is indicated at 40 and like the spacing means of Figs. 1–5, includes a tapered top surface 41 and a tapered bottom surface 42. The spacers 40 are axially staggered from the start end 16 of the tap 10 to a point approximately mid-way of the threaded portion 13. Moreover, one of the spacers identified by the separate reference numeral 43 is slotted as at 44.

It will be understood that the placing of the spacers in different positions controls the rigidity of the tap as desired for different types of material and applications.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. A tap comprising an elongated rod member including a driving portion at one end to apply torque thereto and a shank having a body portion and an externally threaded portion at the other end, said other end of said rod member at said shank having a recessed bore extending axially of said rod member to provide threaded walls in said shank, said threaded walls having a plurality of fissures formed therein by slots which extend through said threaded wall and extend longitudinally through the starting portion of the tap at said other end to provide a plurality of circumferentially spaced cutting blades, and means forming a spacing ring of lesser longitudinal extent than said fissures axially inwardly of said other end and operatively integrated with said cutting blades and extending circumferentially in said fissures to control the contraction and deformation of said cutter blades.

2. A tap as defined in claim 1, said spacing ring constituting a plurality of segments together forming a continuous annular ring.

3. A tap as defined in claim 1, said shank terminating in a start end tapering from full thread depth to less than full thread depth, said spacing ring being spaced axially inwardly of said start end and starting radially inwardly of the thread depth.

4. A tap as defined in claim 1, said spacer ring being axially staggered in the respective fissures from the start end of said threaded portion to a point mid-way thereof for controlling the rigidity of the tap.

5. A tap as defined in claim 2, said spacing ring having an axially extending slot formed in one of said segments in register with a corresponding one of said fissures.

6. A tap as defined in claim 4, one of said axially staggered spacing rings having a slot formed therein in register with a corresponding one of said fissures.

7. A tap as defined in claim 1, and a flat circular disc in the start end of said tap to confine thread cuttings inside of said tap when tapping vertical holes.

8. A tap as defined in claim 2, each of said segments having an inner wall concentric with the bore wall and an outer extremity starting radially inwardly of full thread depth chamfered to provide upper and lower tapered walls.

9. A tap comprising a plurality of alternately circumferentially spaced cutting blades and axially extending slots, and circumferentially extending means forming a spacing ring of lesser longitudinal extent than said slots on said cutting blades in said slots radially inwardly of the cutting edges of the blades and between the ends of the slots to control the contraction and deformation of the cutting blades.

References Cited in the file of this patent

UNITED STATES PATENTS

| | | |
|---|---|---|
| 2,360,472 | Brussell | Oct. 17, 1944 |
| 2,407,160 | Kahn | Sept. 3, 1946 |

FOREIGN PATENTS

| | | |
|---|---|---|
| 1,068,255 | France | June 23, 1954 |